(12) United States Patent
Jeon et al.

(10) Patent No.: US 10,815,613 B2
(45) Date of Patent: Oct. 27, 2020

(54) ARTIFICIAL LEATHER WITH THREE-DIMENSIONAL PATTERN AND MANUFACTURING METHOD THEREOF

(71) Applicants: Hyundai Motor Company, Seoul (KR); Kia Motors Corporation, Seoul (KR); Kolon Glotech, Inc., Gwacheon, Gyeonggi-do (KR)

(72) Inventors: Hong-Chan Jeon, Gyeonggi-do (KR); Bong-Hyun Park, Gyeonggi-do (KR); Ju-Ahn Kim, Daegu (KR); Tae-Gi Kim, Gyeongsangbuk-do (KR); Yong-Tae Ha, Daegu (KR)

(73) Assignees: Hyundai Motor Company, Seoul (KR); Kia Motors Corporation, Seoul (KR); Kolon Glotech, Inc., Gwacheon, Gyeonggi-do (KR)

( * ) Notice: Subject to any disclaimer, the term of this patent is extended or adjusted under 35 U.S.C. 154(b) by 270 days.

(21) Appl. No.: 15/787,468

(22) Filed: Oct. 18, 2017

(65) Prior Publication Data
US 2018/0105976 A1    Apr. 19, 2018

(30) Foreign Application Priority Data
Oct. 19, 2016 (KR) .......................... 10-2016-0135653

(51) Int. Cl.
*D06N 3/18* (2006.01)
*B29C 44/06* (2006.01)
(Continued)

(52) U.S. Cl.
CPC ......... *D06N 3/0065* (2013.01); *B29C 44/022* (2013.01); *B29C 44/06* (2013.01);
(Continued)

(58) Field of Classification Search
CPC ....... B29C 44/022; B29C 44/06; B29C 44/24; B29C 44/3415; B32B 5/18; B32B 5/20;
(Continued)

(56) References Cited

U.S. PATENT DOCUMENTS 3,931,429 A * 1/1976 Austin ................ B29C 44/0461
428/158
2009/0117330 A1   5/2009 Shiina et al.

FOREIGN PATENT DOCUMENTS

KR   10-1993-0002088     2/1993
KR   10-1999-0084269 A   12/1999
(Continued)

*Primary Examiner* — Michael A Tolin
(74) *Attorney, Agent, or Firm* — Mintz Levin Cohn Ferris Glovsky and Popeo, P.C.; Peter F. Corless

(57) ABSTRACT

Provided are an artificial leather and a method of manufacturing the same. The artificial leather includes: a base fabric; a polyvinyl chloride film bonded to a surface of the base fabric; bonding layer formed on a surface of the film; a first foam layer formed on the bonding layer in a patterned shape; a first color layer formed on a surface of the foam layer and having the same pattern as the first foam layer; and a surface treatment layer formed on a surface of the first color layer with the same pattern as the first color layer or formed on a surface of the bonding layer without the first foam layer and the surface of the first color layer. to the artificial leather of the present invention may have a light weight and implement various three-dimensional patterns and colors as compared with a conventional PVC foam artificial leather.

6 Claims, 4 Drawing Sheets

(51) Int. Cl.
| | |
|---|---|
| *B32B 5/20* | (2006.01) |
| *B29C 44/24* | (2006.01) |
| *B32B 27/30* | (2006.01) |
| *D06N 3/06* | (2006.01) |
| *D06N 3/00* | (2006.01) |
| *D06N 3/14* | (2006.01) |
| *B29C 44/02* | (2006.01) |
| *B32B 27/06* | (2006.01) |
| *B32B 3/30* | (2006.01) |
| *B32B 27/16* | (2006.01) |
| *B32B 27/20* | (2006.01) |

(52) U.S. Cl.
CPC ............... *B29C 44/24* (2013.01); *B32B 3/30* (2013.01); *B32B 5/20* (2013.01); *B32B 27/065* (2013.01); *B32B 27/16* (2013.01); *B32B 27/20* (2013.01); *B32B 27/304* (2013.01); *D06N 3/0043* (2013.01); *D06N 3/0059* (2013.01); *D06N 3/0077* (2013.01); *D06N 3/0095* (2013.01); *D06N 3/0097* (2013.01); *D06N 3/06* (2013.01); *D06N 3/14* (2013.01); *D06N 3/145* (2013.01); *D06N 3/146* (2013.01); *D06N 3/147* (2013.01); *D06N 3/183* (2013.01); *B32B 2307/402* (2013.01); *B32B 2307/404* (2013.01); *D06N 2203/048* (2013.01); *D06N 2205/04* (2013.01); *D06N 2209/0823* (2013.01); *D06N 2211/26* (2013.01)

(58) Field of Classification Search
CPC ....... B32B 5/245; B32B 27/065; B32B 27/08; B32B 27/12; B32B 27/20; B32B 27/304; B32B 27/40; B32B 2255/10; B32B 2255/102; B32B 2255/26; B32B 2255/28; B32B 2266/0278; B32B 2307/402; B32B 2307/4023; B32B 2307/4026; B32B 2307/404; B32B 2451/00; B32B 2605/003; D06N 3/0043; D06N 3/005; D06N 3/0059; D06N 3/0065; D06N 3/06; D06N 3/065; D06N 3/08; D06N 3/14; D06N 3/145; D06N 3/183; D06N 2203/048; D06N 2203/068; D06N 2205/04; D06N 2209/0807; D06N 2209/0815; D06N 2209/0823; D06N 2211/26; D06N 2211/261; D06N 2211/263

See application file for complete search history.

(56) References Cited

FOREIGN PATENT DOCUMENTS

| | | |
|---|---|---|
| KR | 10-2001-0029008 | 4/2001 |
| KR | 1000515621 | 10/2005 |
| KR | 10-540860 | 1/2006 |
| KR | 10-0706403 | 4/2007 |
| KR | 10-2010-0008925 | 1/2010 |
| KR | 10-0936326 | 1/2010 |
| KR | 10-0992734 | 11/2010 |
| KR | 10-2011-0054116 | 5/2011 |
| KR | 10-1202118 | 6/2012 |
| KR | 10-1436525 | 8/2014 |
| KR | 10-2014-0115801 | 10/2014 |
| KR | 20140115801 A * | 10/2014 |
| KR | 10-2015-0130774 | 11/2015 |
| WO | 2005-065937 A1 | 7/2005 |

* cited by examiner

ARTIFICIAL LEATHER WITH THREE-DIMENSIONAL PATTERN AND MANUFACTURING METHOD THEREOF

CROSS-REFERENCE TO RELATED APPLICATIONS

The present application makes reference to, claims priority to, and claims the benefit of Korean Patent Application No. 10-2016-0135653, filed on Oct. 19, 2016, the contents of which are hereby incorporated herein by reference, in their entirety.

TECHNICAL FIELD

The present invention relates to an artificial leather having a light weight and various three-dimensional patterns and colors as compared with a conventional PVC artificial leather, and a method manufacturing the same.

BACKGROUND

Leather may be classified into natural leather and artificial leather. The natural leather obtained by processing animal leather has disadvantages, for example, limited production and high price. In addition, the natural leather may not be continuously processed, and it is difficult to expect color diversification, quality uniformity, and the like of the natural leather product. On the other hand, the artificial leather is manufactured similar to the natural leather as possible by using fibers such as nonwoven fabrics or woven fabrics, and serves to compensate for the above disadvantages of the natural leather. However, the artificial leather is still deteriorated as compared with the natural leather in terms of tactile and natural patterns.

Polyvinyl chloride (PVC) foam artificial leather has been widely used for various purposes such as interiors of furniture, wall, or door, furniture fabrics of home or office, bags, car seat covers, and shoemaking fabrics. The PVC foam artificial leather may be formed with a base fabric, a PVC foam sheet bonded to the surface of the base fabric, a PVC film bonded to the surface of the PVC foam sheet, and a surface coating layer formed on the surface of the PVC film. For example, in the related arts, the PVC artificial leather may be manufactured by using an ethylene vinyl acetate copolymer. This method includes: a raw material mixing process of adding and mixing 0.5 to 5 wt % of dicumyl peroxide to an ethylene vinyl acetate copolymer having a vinyl acetate content of 20 to 50 wt %; a mixture extruding process of extruding the mixture by adding the mixture in an extruder; an ethylene vinyl acetate copolymer coating process of forming a semi-product by coating the extruded material on one surface of the fabric; and a foaming process of forming a foam layer in the semi-product by adding steam generated from a foaming machine or adding an organic foaming agent. In addition, in the related arts, a polyvinyl chloride-based artificial leather may include a base layer, a foam layer, a surface layer, and a coating layer, in which the surface layer contains 90 to 95 wt % of a polyvinyl chloride resin; and 5 to 10 wt % of a silk crushed material of 1 to 50 μm, and the coating layer contains a silk crushed material of 1 to 50 μm and an aqueous bonding agent at a weight ratio of 70:30 to 60:40. Further, a polyvinyl chloride-based artificial leather improved water absorption may include: a base layer; a foam layer; a surface layer including 85 to 95 wt % of a polyvinyl chloride resin and 5 to 15 wt % of a bean protein crushed material having an average diameter of 5 to 75 μm; and a coating layer including a bean protein crushed material having an average diameter of 5 to 75 μm and an aqueous bonding agent at a weight ratio of 70:30 to 60:40.

Alternatively, a polyvinyl chloride artificial leather with infrared high reflection may include: a surface layer including a polyvinyl chloride resin, a black pigment in which a perylene black pigment and a carbon black pigment are mixed, and a plasticizer; a foam layer including a polyvinyl chloride resin, a titanium dioxide pigment, and a plasticizer; and a base layer including a polyester fiber containing a titanium dioxide pigment. Nevertheless, functionality of the PVC foam artificial leather and needs improvement relevant to light weight, color diversification, design enhancement, and the like.

SUMMARY OF THE INVENTION

In preferred aspects, provided is a novel artificial leather that has a light weight and implements various three-dimensional patterns and colors as compared with PVC foam artificial leather, and a method for manufacturing the same.

According to an aspect of the present invention, provided is an artificial leather that may include: a base fabric; a polyvinyl chloride film bonded to a surface of the base fabric; bonding layer formed on a surface of the film; a first foam layer formed on the bonding layer in a patterned shape; a first color layer formed on a surface of the first foam layer and having the same pattern as the first foam layer; and a surface treatment layer formed on a surface of the first color layer with the same pattern as the first color layer or formed on a surface of the bonding layer without the first foam layer and the surface of the first color layer.

The artificial leather may further include at least two three-dimensional pattern layers having different patterns and colors and sequentially formed between the bonding layer and the surface treatment layer. Preferably, a first three-dimensional pattern layer may include the first foam layer and the first color layer having the same pattern as the first foam layer and a second three-dimensional pattern layer comprises a second foam layer formed in a second patterned shape and a second color layer having the same pattern as the second foam layer. The polyvinyl chloride film may include a polyvinyl chloride resin, a plasticizer, and a pigment.

Further provided herein is a method of manufacturing an artificial leather, and the method may include: bonding a polyvinyl chloride film onto the surface of a base fabric; forming a bonding layer by coating and drying a composition for the bonding layer on a surface of the film; forming a foaming layer by coating and drying a composition for the foam layer on the bonding layer in a patterned shape; forming a first color layer by coating and drying a composition for the first color layer on a surface of the foaming layer to have the same pattern as the foam layer; forming a surface treatment layer by coating and drying a composition for the surface treatment layer on a surface of the first color layer to have the same pattern as the first color layer or coating and drying the composition for the surface treatment layer on the surface of the bonding layer without the foam layer and the surface of the first color layer; and hot-pressing to perform foaming of the foam layer.

The method may further include alternately forming one or more foam layers and forming one or more color layer. The one or more foam layers may have different patterns and the one or more color layers have different patterns and different colors. The one or more foam layers may have different patterns and the one or more color layers have different patterns and different colors from the first foaming layer and the first color layer.

In another aspect of the present invention, provided is an artificial leather that may include: a base fabric; a polyvinyl chloride film bonded to the surface of the base fabric; a bonding layer formed on a surface of the film; a base color layer formed on a surface of the bonding layer in a patterned shape; a first foam layer formed on the base color layer in a patterned shape; a first color layer formed on a surface of the first foam layer and having the same pattern as the foam layer; and a surface treatment layer formed on a surface of the first color layer with the same pattern as the first color layer or formed on the surface of the bonding layer without the base color layer, the surface of the base color layer without the first foam layer, and the surface of the first color layer.

The artificial leather may further include at least two three-dimensional pattern layers having different patterns and colors and sequentially formed between the bonding layer and the surface treatment layer. Preferably, a first three-dimensional pattern layer may include the first foam layer and the first color layer having the same pattern as the first foam layer and a second three-dimensional pattern layer comprises a second foam layer formed in a second patterned shape and a second color layer having the same pattern as the second foam layer. The polyvinyl chloride film may include a polyvinyl chloride resin, a plasticizer, and a pigment.

In another aspect of the present invention, provided is a method of manufacturing an artificial leather. The method may include: bonding a polyvinyl chloride film onto a surface of a base fabric; forming a bonding layer by coating and drying a composition for the bonding layer on a surface of the film; forming a base color layer by coating and drying a composition for the base color layer on a surface of the bonding layer in a patterned shape; forming a first foam layer by coating and drying a composition for the first foam layer on a surface of the base color layer in a patterned shape; forming a first color layer by coating and drying a composition for the first color layer on a surface of the foam layer to have the same pattern as the first foam layer; forming a surface treatment layer by coating and drying a composition for the surface treatment layer on a surface of the first color layer to have the same pattern as the first color layer, or coating and drying the composition for the surface treatment layer on the surface of the bonding layer without the base color layer, the surface of the base color layer without the first foam layer, and the surface of the first color layer; and hot-pressing to perform foaming of the first foam layer.

The method may further include alternately forming one or more foam layers and forming one or more color layer. The one or more foam layers may have different patterns and the one or more color layers have different patterns and different colors. The one or more foam layers may have different patterns and the one or more color layers have different patterns and different colors from the first foaming layer and the first color layer.

Further provided herein is a vehicle including the artificial leather as described herein.

According to various embodiments of the present invention, an artificial leather and product thereof having a light weight and implementing various three-dimensional patterns and colors, in contrast to general PVC foam artificial leather, may be provided.

Other aspects of the invention are provided infra.

DETAILED DESCRIPTION

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof. It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, various exemplary embodiments of the invention will be described in detail with reference to the accompanying drawings such that they can easily be made and used by those skilled in the art.

The term "different patterns" used in the present invention refers to patterns having different sizes or different shapes, for example, among patterns from distinct layers, or among patterns from distinct parts.

Figure 1:
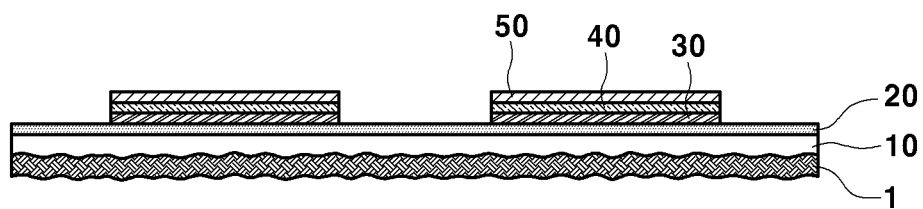
FIG. 1 is a cross-sectional view of an exemplary artificial leather according to an exemplary embodiment of the present invention.
Figure 2:
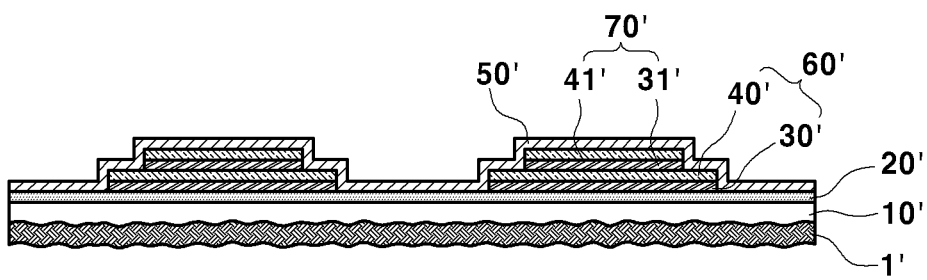
FIG. 2 is a cross-sectional view of an exemplary artificial leather according to an exemplary embodiment of the present invention.

In an aspect of the present invention, provided is an artificial leather which has a light weight and implements various three-dimensional patterns and colors. FIG. 1 is a cross-sectional view of an exemplary artificial leather according to an exemplary embodiment of the present invention. As illustrated in FIG. 1, the artificial leather may include a base fabric 1; a polyvinyl chloride film 10 bonded to a surface of the base fabric; a bonding layer 20 formed on a surface of the film; a first foam layer 30 formed on the bonding layer in a patterned shape; a first color layer 40 formed on a surface of the first foam layer and having the same pattern as the first foam layer; and a surface treatment layer 50 formed on a surface of the first color layer with the same pattern as the color layer or formed on the surface of the bonding layer without the foam layer and the surface of the color layer. FIG. 2 is a cross-sectional view of artificial leather according to an exemplary embodiment of the present invention. As illustrated in FIG. 2, the artificial leather according to an exemplary embodiment of the present invention may include a base fabric 1'; a polyvinyl chloride film 10' bonded to a surface of the base fabric; a bonding layer 20' formed on a surface of the film; at least two three-dimensional pattern layers 60' and 70' sequentially formed on the bonding layer and having different patterns and colors; and a surface treatment layer 50' formed on the uppermost surface of the three-dimensional pattern layers, and/or formed on the surface of the bonding layer without the three-dimensional pattern layers and the surface of the three-dimensional pattern layers. In the artificial leather according to an exemplary embodiment of the present invention, the three-dimensional pattern layer may be formed in a patterned shape and include one foam layer and one color layer having the same pattern as the foam layer. For example, in FIG. 2, the first three-dimensional pattern layer 60' may include a first foam layer 30' and a first color layer 40' and the second three-dimensional pattern layer 70' may include a second foam layer 31' and a second color layer 41'. The first foam layer may be formed on the surface of the bonding layer in a patterned shape. Further, the first color layer may be formed on the surface of the first foam layer, have the same pattern as the first foam layer, and have a different color from the base fabric or the film. Further, the second foam layer may be formed on the surface of the first color layer and have a different pattern from the first foam layer. Further, the second color layer may be formed on the surface of the second foam layer, have the same pattern as the second foam layer, and have a different color from the first color layer.

Figure 3:
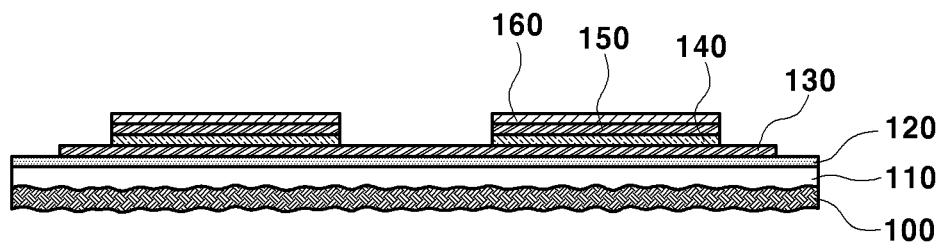
FIG. 3 is a cross-sectional view of an exemplary artificial leather according to an exemplary embodiment of the present invention.

FIG. 3 is a cross-sectional view of an exemplary artificial leather according to an exemplary embodiment of the present invention. As illustrated in FIG. 3, the artificial leather may include a base fabric 100; a polyvinyl chloride film 110 bonded to a surface of the base fabric; a bonding layer 120 formed on a surface of the film; a base color layer 130 formed on a surface of the bonding layer in a patterned shape; a first foam layer 140 formed on the base color layer in a patterned shape; a first color layer 150 formed on a surface of the foam layer and having the same pattern as the foam layer; and a surface treatment layer 160 formed on a surface of the first color layer with the same pattern as the first color layer and/or formed on the surface of the bonding layer without the base color layer, the surface of the base color layer without the first foam layer, and the surface of the first color layer. Further, an exemplary artificial leather according to an embodiment of the present invention may include a base fabric; a polyvinyl chloride film bonded to the surface of the base fabric; a bonding layer formed on a surface of the film; a base color layer formed on a surface of the bonding layer in a patterned shape; at least two three-dimensional pattern layers (e.g. a first three-dimensional pattern layer and a second three-dimensional pattern layer) sequentially formed on the base color layer and having different patterns and colors; and a surface treatment layer formed on the uppermost surface of the three-dimensional pattern layers and/or formed on the surface of the bonding layer without the base color layer, the surface of the base color layer without the three-dimensional pattern layers, and the surface of the three-dimensional pattern layers. In an exemplary artificial leather according to an exemplary embodiment of the present invention, the three-dimensional pattern layer may include one foam layer and one color layer having the same pattern as the foam layer and has different pattern and color from the base color layer. For example, an exemplary artificial leather according to another preferred embodiment of the present invention may include a first three-dimensional pattern layer and a second three-dimensional pattern layer. In this case, the first three-dimensional pattern layer may include a first foam layer which is formed on the surface of the base color layer in a patterned shape and a first color layer which is formed on the surface of the first foam layer, has the same pattern as the first foam layer, and has a different color from the base color layer. Further, the second three-dimensional pattern layer may include a second foam layer which is formed on the surface of the first color layer and has a different pattern from the first foam layer and a second color layer which is formed on the surface of the second foam layer, has the same pattern as the second foam layer, and has a different color from the first color layer.

Hereinafter, the artificial leather according to the present invention will be described for each component.

Base Fabric

The term "base fabric" as used herein refers to a base layer of the artificial leather. An exemplary base fabric may be a fabric which is used as a base layer in PVC artificial leather or polyurethane artificial leather, and the type thereof is not limited. For example, the base fabric may be selected from natural leather; a woven fabric, a nonwoven fabric, or a skewed fabric made of natural fibers or synthetic fibers; a mesh fabric, and the like.

Polyvinyl Chloride Film

The term "polyvinyl chloride film" as used herein refers to a layer or film (e.g. thin film) which may be bonded to the surface of the base fabric to give a predetermined thickness to the artificial leather and simultaneously give a flattened surface to the bonding layer to be described below, thereby facilitating the formation of the foam layer. The base fabric in the artificial leather according to the present invention may be a substrate having a predetermined curve formed on the surface such as natural leather; a woven fabric, a nonwoven fabric, or a skewed fabric made of natural fibers or synthetic fibers; and a mesh fabric. When the bonding layer is directly formed or attached on the base fabric, the bonding layer may have a similar shaped curve to the curve formed on the surface of the base fabric because the thickness thereof may be too small. In this case, since the curve is formed on the surface of the bonding layer which acts as a support when the foam layer is formed, the foaming itself may become difficult or the foaming may not be uniformly performed. To solve the problem, in the related arts, a planarization layer is formed on the surface of the bonding layer and then a foam layer is formed by using the planarization layer having a flat surface as a support.

In an exemplary embodiment of the present invention, the polyvinyl chloride film as one component of the artificial leather may be formed using a composition including a polyvinyl chloride resin, a plasticizer, and a pigment. Further, the polyurethane film may be formed using a composition including a polyurethane resin, a plasticizer, and a pigment. In an exemplary embodiment, the polyvinyl chloride film may be prepared by calendering a composition including an amount of about 40 to 55 wt % of a polyvinyl chloride resin, an amount of about 30 to 45 wt % of a plasticizer, an amount of about 2 to 5 wt % of a pigment, and an amount of about 5 to 20 wt % of an auxiliary additive, based on the total weight of the composition. The plasticizer may be used in preparation for softening an ink coating and a non-limiting example thereof may include phthalate plasticizers such as dioctyl phthalate, dydodecyl phthalate, diisodecyl phthalate, triethylene glycol dicaprylate, and dimethyl glycol phthalate, and in addition, the plasticizer includes tricresyl phosphate, dioctyl adipate, dibutyl sebacate, triacetyl glycerin, and the like. The auxiliary additive may be at least one selected from a processing aid, a heat stabilizer, an ultraviolet absorber, a flame retardant, and the like. The polyvinyl chloride film may be bonded to the surface of the base fabric by calendering. The calendering may be one of molding methods of plastic and include a process of putting and rolling a thermoplastic resin between two heated rolls to form a film or sheet-like molded product. In addition, the calendering may include coating plastic on the surface of cloth, paper, or the like.

Bonding Layer

The term "bonding layer" as used herein refers to a layer which strengths bonding performance between the polyvinyl chloride film or the like which is a printed material and the foam layer, or between the polyvinyl chloride film or the like and the base color layer. The bonding layer may be formed on the entire surface of the polyvinyl chloride film. The bonding layer may be formed using a composition for the bonding layer including an amount of about 20 to 50 wt % of polyurethane, an amount of about 2 to 10 wt % of a curing agent, an amount of about 45 to 70 wt % of a diluting solvent and an amount of about 1 to 5 wt % of an auxiliary additive, based on the total weight of the composition.

Foam Layer (Including Foam Layer Configuring Three-Dimensional Pattern Layer)

The term "foam layer" as used herein refers to a layer which may impart a three-dimensional effect to the final artificial leather. The three-dimensional should be capable of being determined visually (naked eye), for example, the artificial leather visually (naked eye) has more topography or texturing as a result of the foam layer than without the foam layer. Preferably, foaming may occur inside the foam layer during heating and pressing thereby providing a three-dimensional effect. The foam layer may be formed on the surface of the bonding layer in a patterned shape, and alternatively, the foam layer may be formed on the surface of the base color layer in a patterned shape. In addition, in order to give various three-dimensional effects to the artificial leather of the present invention, a plurality of foam layers having different patterns may be alternately formed with the color layers.

The foam layer may be formed using a composition for the foam layer, which may include an amount of about 20 to 50 wt % of polyurethane, an amount of about 1 to 20 wt % of a foaming agent, an amount of about 2 to 10 wt % of a curing agent, and an amount of about 40 to 70 wt % of a diluted solvent, based on the total weight of the composition for the foam layer. Further, the foam layer may also be formed of a coating composition for the foam layer including an amount of about 75 to 90 wt % of polyurethane, an amount of about 5 to 15 wt % of water, an amount of about 1 to 20 wt % of a foaming agent, and an amount of about 1 to 5 wt % of an auxiliary additive, based on the total weight of the composition for the foam layer. Also, the foam layer may further have the three-dimensional effect by repeating the coating of the composition for the foam layer repeatedly to obtain a required level of the three-dimensional effect. The foaming agent may include a thermally decomposed foaming agent. The thermally decomposed foaming agent may include isobutane copolymers, azos such as azodicarbon amide (ADCA) and azobis formamide, ydrazides such as oxy benzene sulfonyl hydrazide (OBSH) and palladium toluene sulfonyl hydrazide, and the like. The content of the thermally decomposed foaming agent in the composition for the foam layer may be suitably set according to a type of foaming agent, a foaming ratio (a ratio of a thickness of the foam layer to a thickness of a base layer containing the foaming agent), and the like. Generally, the foaming ratio may be suitably 1.5 times or greater or preferably, about 3 to 8 times. Further, the composition for the foam layer may further include a foaming assistant agent that promotes decomposition of the foaming agent in order to further improve the foaming effect. The foaming assistant agent may be variously selected according to a type of foaming agent. For example, when azodicarbon amide is used as the foaming agent, the foaming assistant agent may use at least one selected from carbonic acid hydrazide such as adipic acid dihydrazide and oxalic acid hydrazide, zinc oxide, lead sulfate, urea, zinc stearate, and the like. Further, the foaming assistant agent in the composition for the foam layer composition may suitably include an amount of about 0.3 to 10 parts by weight, or about 1 to 5 parts by weight based on 100 parts by weight of the composition for the foam layer.

Color Layer (Including Base Color Layer and Color Layer Configuring Three-Dimensional Pattern Layer)

The term "color layer" as used herein refers to a layer that may give various design effects such as color patterns and the like to the final artificial leather. The color layer may be formed on the surface of the foam layer and have the same pattern as the corresponding foam layer, and the base color layer may be formed on the surface of the bonding layer in a patterned shape. In addition, in order to give various design effects to the artificial leather according to the present invention, a plurality of color layers having different colors may be alternately formed with the foam layers having different patterns. The color layer may be formed by coating and drying the composition for the color layer on the surface of the bonding layer or the surface of the foam layer. The composition for the color layer may be selected from various known types of polyurethane-based inks. For example, the composition for the color layer may include an amount of about 25 to 50 wt % of polyurethane, an amount of about 1 to 15 wt % of a pigment, an amount of about 1 to 10 wt % of a curing agent, an amount of about 1 to 5 wt % of an auxiliary additive, and an amount of about 40 to 65 wt % of a diluted solvent, based on the total weight of the composition for the color layer. Further, the composition for the color layer may include an amount of about 30 to 40 wt % of polyurethane, an amount of about 40 to 50 wt % of water, an amount of about 5 to 35 wt % of a pigment, an amount of greater than 0 to less than about 5 wt % of a thickener and an amount of greater than 0 to less than about 5 wt % of an auxiliary additive, based on the total weight of the composition for the color layer. Further, the composition for the color layer may include an amount of about 10 to 40 wt % of polyurethane; an amount of about 5 to 30 wt % of tackifier in an emulsion form; an amount of about 0.5 to 15 wt % of a pigment; an amount of about 1 to 20 wt % of an auxiliary additive, and a residual amount of diluted solvent, based on the total weight of the composition for the color layer. The pigment in the composition for the color layer is not limited, and a non-limiting example of the pigment may include phthalocyanine blue, phthalocyanine green, carbon black, disazo yellow, crystal violet, titanium dioxide, and the like. For instance, pigments used in the color layer of the present invention may be represented by color index numbers. For example, red pigments for forming red filter segments may include C.I Pigment Red 7, 9, 14, 41, 48:1, 48:2, 48:3, 48:4, 81:1, 81:2, 81:3, 97, 122, 123, 146, 149, 168, 177, 178, 180, 184, 185, 187, 192, 200, 202, 208, 210, 215, 216, 217, 220, 223, 224, 226, 227, 228, 240, 246, 254, 255, 264, 272, and the like and may be combined with yellow or orange pigments. Further, yellow pigments for forming yellow filter segments may include, for example, C.I. Pigment Yellow 1, 2, 3, 4, 5, 6, 10, 12, 13, 14, 15, 16, 17, 18, 20, 24, 31, 32, 34,35, 35:1, 36, 36:1, 37, 37:1, 40, 42,43, 53, 55, 60, 61, 62, 63, 65, 73, 74, 77, 81, 83, 86, 93, 94, 95, 97, 98, 100, 101, 104, 106, 108,109, 210, 113,114, 115, 116, 117, 118, 119, 120, 123, 125, 126, 127, 128, 129, 137, 138, 139, 147, 148, 150, 151, 152, 153, 154, 155, 156, 161, 162, 164, 166, 167, 168, 169, 240, 171, 172, 173, 174, 175, 176, 177, 179, 180, 181, 182, 185, 187, 188, 193, 194, 199, and the like. Also, the orange pigments may include C.I. Pigment orange 36, 43, 51, 55, 59, 61, and the like. Also, the green pigments may include C.I. Pigment Green 7, 10, 36, 37, and the like. Also, the blue pigments may include C.I. Pigment Blue 15, 15:1, 15:2, 15:3, 15:4, 15:6, 16, 22, 60, 64, and the like. Also, violet pigments may include C.I. Pigment Violet 1, 19, 23, 27, 29, 30, 32, 37, 40, 42, 50, and the like. In an exemplary embodiment, the pigments may be combined, for example, violet pigments may be used in combination with the blue pigments. Also, as a magenta pigment, violet and red pigments of C.I. Pigment Violet 1, 19, and C.I. pigment Red 144, 146, 177, 169, 81, and the like may be used. The yellow pigments may be combined with the magenta pigments. The present invention refers to a polyurethane-based ink disclosed in Korean Patent Laid-Open Publication No. 10-2015-0130774 and a screen printing ink disclosed in Korean Patent Registration No. 10-1436525 filed by the applicant of the present invention in association with the composition for the color layer.

Surface Treatment Layer

The term "surface treatment layer" as used herein refers to a layer that may protect the surface of a color layer; a base color layer in which the foam layer or the three-dimensional pattern layer is not formed; and/or a bonding layer in which the foam layer, the three-dimensional pattern layer, or the base color layer is not formed. The surface treatment layer may also be formed only on the surface of the color layer disposed at the uppermost portion. If necessary or alternatively, the surface treatment layer may be formed on the entire surface including the color layer. Also, leathery grains may be formed on the surface treatment layer through an embossing process.

The surface treatment layer may be formed by a composition for the surface treatment layer including an amount of about 40 to 60 wt % of polyurethane, an amount of about 1 to 10 wt % of a curing agent, an amount of about 20 to 50 wt % of a diluting solvent, and an amount of about 1 to 10 wt % of an auxiliary additive, based on the total weight of the composition for the surface treatment layer. Further, considering durability and stain resistance, the surface treatment layer may be formed by a composition for the surface treatment layer including an amount of about 6 to 18 wt % of a polycarbonate urethane resin, an amount of about 6 to 18 wt % of a hydroxyl acrylic resin, an amount of about 5 to 20 wt % of a curing agent, and an amount of about 55 to 80 wt % of a diluting solvent, based on the total weight of the composition for the surface treatment layer. The polycarbonate urethane resin may be formed by a polymerization reaction of polyisocyanate and polycarbonate polyol, and the hydroxyl acrylic resin may be formed by a polymerization reaction of monomers having a hydroxyl group and an ethylenic unsaturated bond and (meth)acrylic monomers.

The bonding layer, the foam layer, the color layer, and the surface treatment layer may be formed by the composition for the bonding layer, the composition for the foam layer, the composition for the color layer, and the composition for the surface treatment layer, as described herein, and the compositions may include polyurethane as a common component. The polyurethane means a material formed by the polymerization of at least one polyisocyanate and at least one polyol. The polyisocyanate forming the polyurethane may include two or more isocyanate groups, but a kind thereof may be not particularly limited. For example, the polyisocyanate may include aliphatic polyisocyanate, alicyclic polyisocyanate, aromatic aliphatic polyisocyanate, aromatic polyisocyanate, and the like, which are generally used for preparation of polyurethane. The aliphatic polyisocyanate usable in the present invention may include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanate methyl caproate, and 1,12-dodecamethylene diisocyanate; aliphatic triisocyanates such as lysine ester triisocyanate, 1,4,8-triisocyanate octane, 1,6,11-triisocyanate undecane, 1,8-diisocyanate-4-isocyanate methyloctane, 1,3,6-triisocyanate hexane, and 2,5,7-trimethyl-1,8-diisocyanate-5-isocyanate methyloctane; and the like. The alicyclic polyisocyanate used in the present invention may include alicyclic diisocyanates such as 1,3-cyclopentene diisocyanate, 1,4-cyclohexane diisocyanate, 1,3-cyclohexane diisocyanate, 3-isocyanate methyl-3,5,5-trimethylcyclohexyl isocyanate (usual name: isophorone diisocyanate), 4,4'-methylenebis(cyclohexyl isocyanate), methyl-2,4-cyclohexane diisocyanate, methyl-2,6-cyclohexane diisocyanate, 1,3- or 1,4-bis(isocyanatomethyl) cyclohexane (usual name: hydrogenated xylene diisocyanate) or a mixture thereof, and norbornan diisocyanate; alicyclic triisocyanates such as 1,3,5-triisocyanate cyclohexane, 1,3,5-trimethylisocyanate cyclohexane, 2-(3-isocyanatopropyl)-2,5-di(isocyanatomethyl)-bicyclo (2.2.1) heptane, 2-(3-isocyanatopropyl)-2,6-di(isocyanatomethyl)-bicyclo (2.2.1) heptane, 3-(3-isocyanatopropyl)-2,5-di(isocyanatomethyl)-bicyclo (2.2.1) heptane, 5-(2-isocyanatoethyl)-2-isocyanatomethyl-3-(3-isocyanatopropyl)-bicyclo (2.2.1) heptane, 6-(2-isocyanatoethyl)-2-isocyanatomethyl-3-(3-isocyanatopropyl)-bicyclo (2.2.1) heptane, 5-(2-isocyanatoethyl)-2-isocyanatomethyl-2-(3-isocyanatopropyl)-bicyclo (2.2.1) heptane, and 6-(2-isocyanatoethyl)-2-isocyanatomethyl-2-(3-isocyanatopropyl)-bicyclo (2.2.1) heptane; and the like. The aromatic aliphatic polyisocyanate used in the present invention may include aromatic aliphatic diisocyanates such as 1,3- or 1,4-xylene diisocyanate or a mixture thereof, ω,ω'-diisocyanate-1,4-diethylbenzene, and 1,3- or 1,4-bis(1-isocyanate-1-methylethyl) benzene (usual name: tetramethyl xylene diisocyanate) or a mixture thereof, aromatic aliphatic triisocyanates such as 1,3,5-triisocyanate methylbenzene, and the like. The aromatic polyisocyanate used in the present invention may include aromatic diisocyanates such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or a mixture thereof, 2,4- or 2,6-tolylene diisocyanate or a mixture thereof, 4,4'-toluidine diisocyanate, and 4,4'-diphenyl ether diisocyanate; aromatic triisocyanates such as triphenylmethane-4,4',4"-triisocyanate, 1,3,5-triisocyanate benzene, and 2,4,6-triisocyanate toluene; aromatic tetracyanates such as 4,4'-diphenylmethane-2,2',5,5'-tetraisocyanate; and the like. These polyisocyanates may be used alone or in a combination including two or more kinds. Further, the polyol for forming the polyurethane may be a polyhydroxy compound which may be obtained by substituting a plurality of hydrogens present on hydrocarbon with a hydroxyl group. Preferably, the polyol may be a product obtained by addition-polymerizing one or more alkylene oxides (for example, ethylene oxide, propylene oxide, butylene oxide, and tetrahydrofuran) with a compound having two or more active hydrogens. For example, the compound having two or more active hydrogens used in the present invention may include ethylene glycol, propylene glycol, butanediol, diethylene glycol, glycerol, hexanetriol, trimethylol propane, pentaerythritol, and the like. In addition, the compound may include polyalcohols such as polyether polyols (for example, polytetramethylene glycol, polyethylene glycol, polypropylene glycol, polyoxypropylene diol, polyoxypropylene triol, and polyoxybutylene glycol), polyolefin polyols (for example, polybutadiene polyols and polyisoprene polyol), polytetramethyleneoxide glycol (PTMG), adipate polyol, lactone polyol, and polyester polyol (for example, castor oil) and polyphenols such as resorcinol and bisphenol. Further, in the present invention, the polyurethane may be preferably ester-type polyurethane formed by polymerization between polyisocyanate and polyester polyol. The polyisocyanate used for forming the ester-type polyurethane may be selected from hexamethylene diisocyanate, 4,4'-methylenebis(cyclohexyl isocyanate), 1,12-dodecamethylene diisocyanate, and the like. Further, the polyester polyol used for forming the ester-type polyurethane may be obtained by depolymerizing polyester into polyol having two or more hydroxyl groups in one molecule. The polyester may include polyethylene terephthalate (PET), polytrimethylene terephthalate, polybutylene terephthalate, polyethylene naphthalate, polybutylene terephthalate, and the like. The polyol may include ethylene glycol, 1,3-propanediol, 1,2-propanediol, 1,4-butanediol, diethylene glycol, triethylene glycol, polyethylene glycol, dipropylene glycol, 1,3-butanediol, neopentyl glycol, spiroglycol, dioxane glycol, adamantanediol, 3-methyl-1,5-pentanediol, methyloctanediol, 1,6-hexanediol, 1,4-cyclohexanedimethanol, 2-methylpropanediol, hexamethylene glycol, octylene glycol, 9-nonanediol, 2,4-diethyl-1,5-pentanediol, and the like.

The color layer may be formed by the composition for the color layer and the composition may include a thickener. The thickener may improve bonding to the surface of the fabric or the foam layer while reducing the penetration of the coated composition into the inside of the fabric, thereby painting curvy patterns. Preferably, the thickener may be selected from synthetic resins such as an ethylene vinyl alcohol (EVA) resin and an acrylic resin, gums such as guar gum, locust bean gum, tamarin gum, xanthan gum, and arabic gum, natural polysaccharides, cellulosic derivatives such as carboxymethylcellulose, and the like.

The bonding layer, the color layer, and the surface treatment layer may be formed by the composition for the bonding layer, the composition for the color layer, and the composition for the surface treatment layer, and the compositions include curing agents as a common component. The curing agent may be selected from known curing agents used for curing of polyurethane. The curing agents may include an isocyanate curing agent, an epoxy curing agent, a melamine curing agent, a carbodiimide curing agent, an oxazoline curing agent, an aziridine curing agent. The curing agent may preferably include a polyisocyanate type isocyanate-based curing agent for compatibility with other components. The polyisocyanate type curing agent may be selected from aliphatic polyisocyanates, alicyclic polyisocyanates, aromatic aliphatic polyisocyanates, and aromatic polyisocyanates which are used for forming polyurethane. The polyisocyanate type curing agent may preferably aliphatic polyisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanate methyl caproate, 1,12-dodecamethylene diisocyanate, lysine ester triisocyanate, 1,4,8-triisocyanate octane, 1,6,11-triisocyanate undecane, 1,8-diisocyanate-4-isocyanate methyloctane, 1,3,6-triisocyanate hexane, and 2,5,7-trimethyl-1,8-diisocyanate-5-isocyanate methyloctane. In addition, the curing agent may include aliphatic polyisocyanate and ethyl acetate, which may be preferably mixed at a weight ratio of about 1:1 to 9:1.

The bonding layer, the foam layer, the color layer, and the surface treatment layer may be formed by the composition for the bonding layer, the composition for the foam layer, the composition for the color layer, and the composition for the surface treatment layer, and the compositions include auxiliary additives as a common component. However, although the auxiliary additives included in the compositions of the present invention are the same as each other in terms of expression, actual components may be different from each other. The auxiliary additives may be at least one selected from the group consisting of a glossing agent, a quenching agent, an anti-scratch agent, a crosslinking agent, a defoaming agent, a slip agent, a coupling agent, a foaming assistant agent, and a dispersant. The glossing agent may be selected from known glossing agents and may be at least one selected from the group consisting of, for example, polyacrylates, polyurethanes, silicones, waxes, paraffins and paraffin/mineral oil blends. The quenching agent is a material for inhibiting light emission, and it may be selected from known quenching agents as, and may be at least one selected from, for example, precipitated silica, amorphous silica prepared by treating particles of silica with a hydrophilic polyolefin wax, PLAMAT, silica deformed with a silane-based coupling agent, titanium dioxide, polyimide powder, an ester amide condensation product, and the like. Also, the anti-scratch agent may be selected from known anti-scratch agents, and may be at least one selected from, for example, 7-hydroxy-5-methyl-1,3,4-triazaindolizine, 5-amino-1H-tetrazole, 3-mercapto-1,2,4-triazole, 1-phenyl-5-mercapto-1H-tetrazole, 5-methyl-1H-benzotriazole, and the like. Also, the crosslinking agent, as an additive for promoting formation of coating of polyurethane and improving strength of coating formed, may use aliphatic polyamine-based crosslinking agents such as ethylenediamine, propylenediamine-1,2 and -1,3, tetramethylenediamine-1,4, hexamethylenediamine-1,6, an isomer mixture of 2,2,4- and 2,4,4-trimethyl hexamethylene diamine, 2-methylpentamethylene diamine and bis-(β-aminoethyl) amine (diethylene triamine), triethylamine, triisobutylamine, trioctylamine, triisodecylamine, triethanolamine, 4,4-diphenylmethane, diisocyanate, epoxy silane or a mixture of aliphatic polyisocyanate and ethylacetate at a weight ratio of 4:1 to 6:1. The defoaming agent is used for removing harmful bubbles and may include silicone defoaming agents such as dimethylpolysiloxane, methylethylpolysiloxane, and diethylpolysiloxane and non-silicon defoaming agents such as mineral oils, alcohols, and organic phosphates, and these defoaming agent all may be used. Such defoaming agents may be used in a powder form, an emulsion form, an oil form, a compound form, and the like, and are not greatly restricted. Specific examples of defoaming agents may include, but be not limited to, CELANT-DF3, CELANT-DF18, CELANT-EF23, CELANT-DF600, KF96 series, FK-150, and FK-500 products. Further, the slip agent may use oleic acid, LC-102N, LC-104N, LC-140B/P, LC-402F, or the like as a preparation for improving friction resistance by smoothing the ink coating. In addition, the coupling agent is a compound having a reaction group (for example, a hydroxyl group, a methoxy group, and an ethoxy group) which binds to an inorganic material such as glass and metal and a reaction group (for example, a vinyl group, an epoxy group, an amino group, a methacryl group, and a thiol group) which binds to an organic material such as a synthetic resin at both terminals, and includes the silane, titanate, chromium, aluminum, zirconium, and the like and the type thereof is not limited thereto. Specific examples of the silane-based coupling agent may include epoxy group-containing silanes such as 2-(3,4 epoxycyclohexyl)-ethyltrimethoxysilane, 3-glycidoxytrimethoxysilane, 3-glycidoxypropyltriethoxysilane, and 3-glycidoxypropyltriethoxysilane; amine group-containing silanes such as N-2(aminoethyl)3-aminopropylmethyldimethoxysilane, N-2(aminoethyl)3-aminopropyltrimethoxysilane, N-2(aminoethyl)3-aminopropyltriethoxysilane, 3-aminopropyltrimethoxysilane, 3-aminopropyltriethoxysilane, 3-trithoxysilyl-N-(1,3-dimethylbutylidene) propylamine, and N-phenyl-3-aminopropyltrimethoxysilane; mercapto group-containing silanes such as 3-mercaptopropylmethyldimethoxysilane, 3-mercaptopropyltrimethoxysilane, and 3-mercaptopropyltriethoxysilane; isocyanate group-containing silanes such as 3-isocyanate propyl triethoxysilane; vinyl group-containing silanes such as vinyl trichlorosilane, vinyltri(2-methoxyethoxy) silane, vinyltriethoxysilane, and vinyltrimethoxysilane; metacryl group-containing silanes such as 3-methacryloxypropyltrimethoxysilane, and the like. Also, these silanes may be used alone or in a combination of two or more kinds. Further, the dispersant is a preparation for helping the pigment to be dispersed in the polyurethane-based ink and includes, for example, TEGO®Dispers 610 and BYK 4130 products and the like as commercial products. Also, the dispersant may also use polyether-modified silicone oil, aralkyl-modified silicone oil, fluoroalkyl-modified silicone oil, long-chain alkyl-modified silicone oil, higher fatty acid ester-modified silicone oil, higher fatty acid amide-modified silicone oil, polyether long-chain alkylaralkyl-modified silicone oil, long-chain alkylaralkyl-modified silicone oil, polyether-modified silicone oil, polyether methoxy-modified silicone oil, polyimide siloxane, polyamideimide siloxane, polyamide siloxane, polyester siloxane, and the like. The bonding layer, the foam layer, the color layer and the surface treatment layer, which are components of the artificial leather according to the present invention, are formed by the composition for the bonding layer, the composition for the foam layer, the composition for the color layer and the composition for the surface treatment layer, and the compositions include a diluted solvent as a common component. The diluted solvent may give a coating property at an appropriate level by adjusting the viscosity of the composition. The diluted solvent used in the present invention may uniformly disperse or dissolve a urethane resin or an acrylic resin, the kind thereof is not largely limited. For example, the diluted solvent may suitably include by at least one selected from the group consisting of ethylene glycol, propylene glycol, diethylene glycol, dipropylene glycol, triethylene glycol, hexylene glycol, 1,5-pentanediol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether, propylene glycol monobutyl ether, dipropylene glycol monomethyl ether, dipropylene glycol monoethyl ether, dipropylene glycol monobutyl ether, diethylene glycol dimethyl ether, dipropylene glycol dimethyl ether, formamide, monomethylformamide, dimethylformamide, monoethylformamide, diethylformamide, acetamide, monomethylacetamide, N-methylpyrrolidone, N-ethylpyrrolidone, N,N-dimethylformamide, N,N-dimethylacetamide, dimethylsulfoxide, dimethylsulfone, diethylsulfone, bis(2-hydroxysulfone), tetramethylenesulfone, acetone, methyl ethyl ketone, methyl isopropyl ketone, methyl isoethyl ketone, methyl isobutyl ketone, cyclohexanone, pentane, hexane, dodecane, tetradecane, benzene, trimethyl benzene, butyl benzoate, dodecylbenzene, xylene, toluene, tetrahydrofuran, 1,4-dioxane and tetrahydrofuran, 1,3-dioxane, methanol, ethanol, n-propanol, isopropylalcohol, n-butanol, hexanol, nonanol, cyclohexanol, benzyl alcohol, 2-methoxy-ethanol, 2-butoxy-ethanol, a-terpineol, benzyl alcohol, 2-hexyl decanol, 3-methoxypropanol, ethyl cellosolve, butyl cellosolve, methyl carbitol, butyl carbitol, hexyl carbitol, methyl acetate, ethyl acetate, ethyl lactate, n-propyl acetate, isopropyl acetate, ethyl propionate, butyl acetate, isobutyl acetate, diethyl adipate, diethyl phthalate, diethylene glycol monobutyl acetate, ethylene glycol monomethyl ether acetate, ethylene glycol monoethyl ether acetate, ethylene glycol monoisopropyl ether, ethylene glycol monobutyl ether acetate, propylene glycol monomethyl ether acetate, propylene glycol monoethyl ether acetate, 3-methoxypropyl acetate, and naphtha. The diluted solvent may be used in combination of at least two selected from dimethylformamide, methyl ethyl ketone, propylene glycol monomethyl ether acetate, ethylene glycol monoethyl ether, cyclohexanone, and naphtha, for the compatibility with other components and smooth removal in a drying process to be described below.

Figure 4:
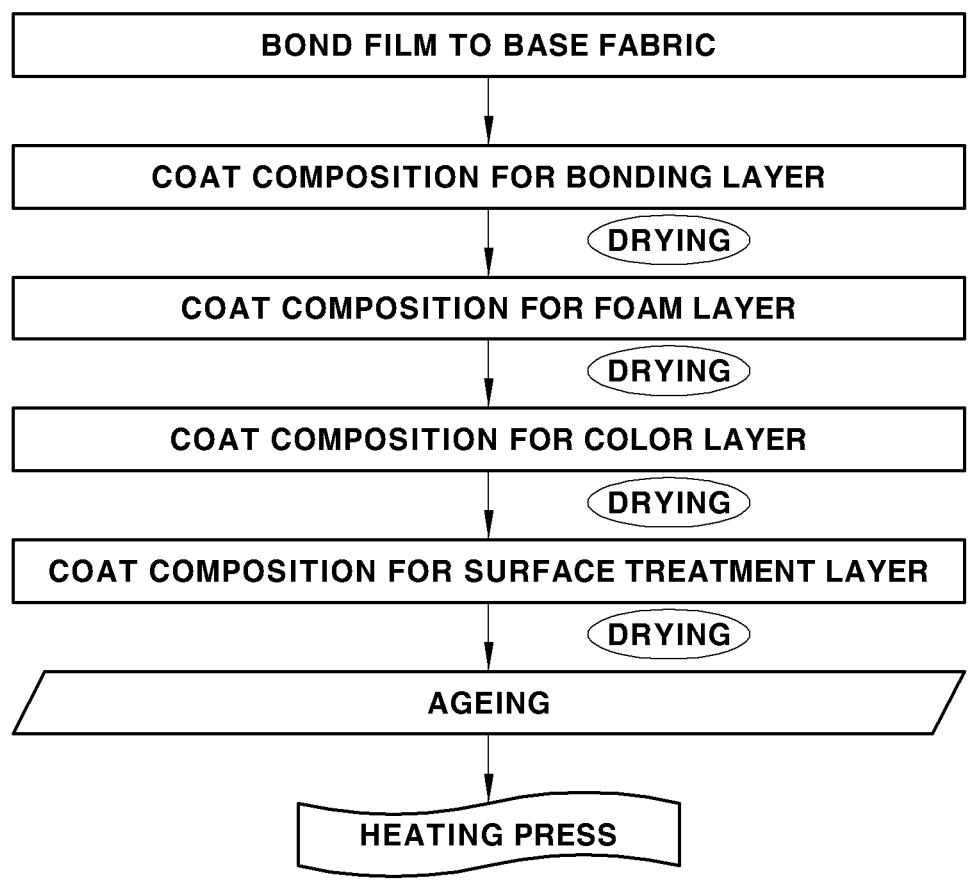
FIG. 4 illustrates an exemplary manufacturing process of an exemplary artificial leather according to an exemplary embodiment of the present invention.
Figure 5:
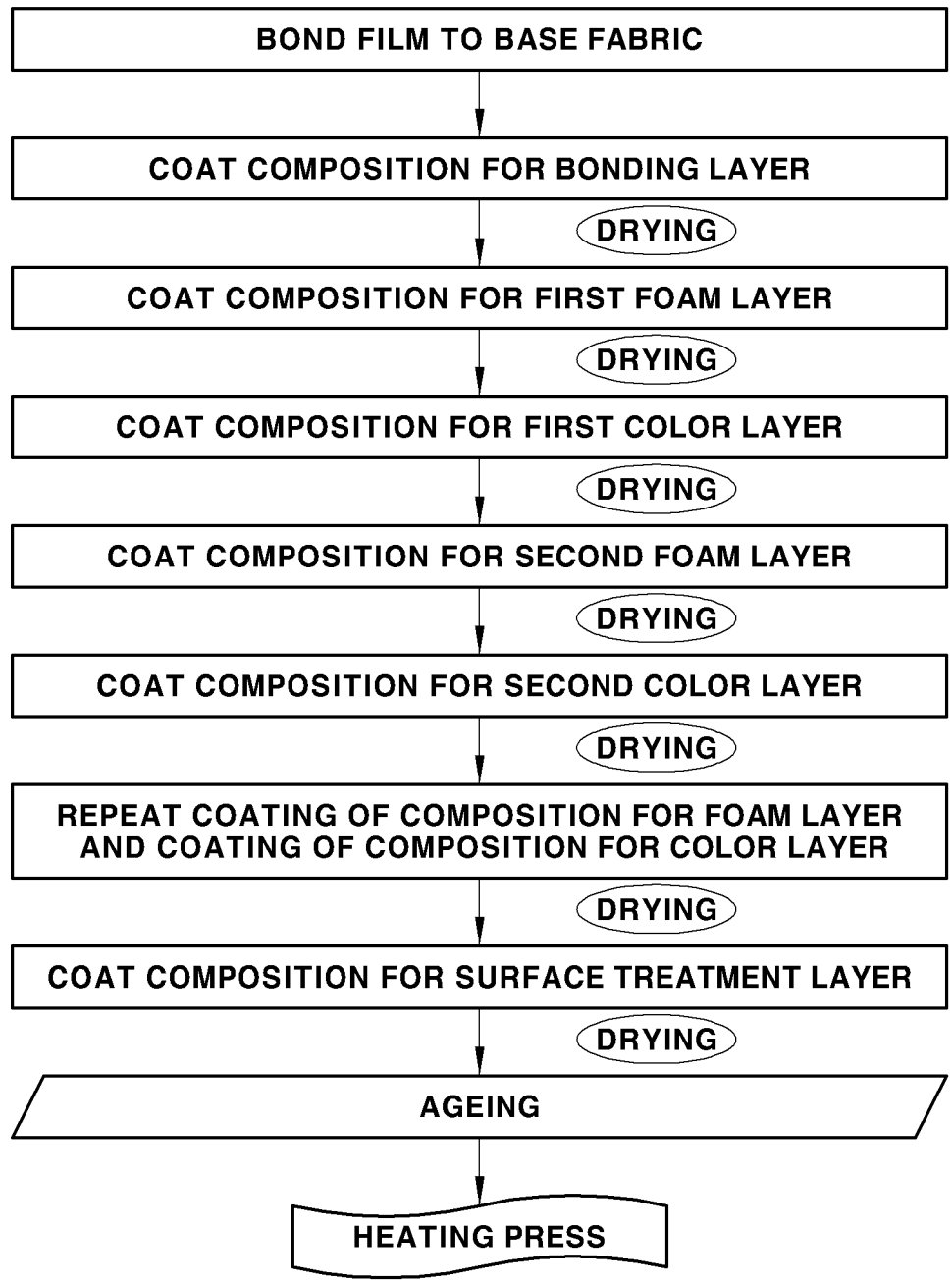
FIG. 5 illustrates an exemplary manufacturing process of an exemplary artificial leather according to an exemplary embodiment of the present invention.

The artificial leather according to the embodiments of the present invention may have a light weight and implement various three-dimensional patterns and colors. FIG. 4 illustrates a exemplary manufacturing process of artificial leather according to an exemplary embodiment of the present invention. As illustrated in FIG. 4, a manufacturing method of artificial leather may include bonding a polyvinyl chloride film onto the surface of a base fabric; forming a bonding layer by coating and drying a composition for the bonding layer on a surface of the film; forming a first foaming layer by coating and drying a composition for the first foam layer on the bonding layer in a patterned shape; forming a first color layer by coating and drying a composition for the first color layer on a surface of the first foaming layer to have the same pattern as the first foam layer; forming a surface treatment layer by coating and drying a composition for the surface treatment layer on the surface of the first color layer to have the same pattern as the first color layer or coating and drying the composition for the surface treatment layer on the surface of the bonding layer without the first foam layer and the surface of the first color layer; and hot-pressing to perform foaming of the first foam layer. The manufacturing method may further include alternately forming one or more foam layers and forming one or more color layers. For instance, the forming of the foam layer and the forming of the color layer may be preferably alternately repeated at least two times, and the foam layers formed above may have different patterns and the color layers may have different patterns and different colors. FIG. 5 illustrates an exemplary manufacturing process of artificial leather according to a preferred embodiment of the present invention. As illustrated in FIG. 5, the manufacturing method of artificial leather may include bonding a polyvinyl chloride film onto a surface of a base fabric; forming a bonding layer by coating and drying a composition for the bonding layer on a surface of the film; forming a first foam layer by coating and drying a composition for the first foam layer on a surface of the bonding layer in a pattered shape; forming a first color layer by coating and drying a composition for the first color layer on a surface of the first foam layer to have the same as the first foam layer; forming a second foam layer by coating and drying a composition for the second foam layer on a surface of the first color layer to have a different pattern from the first foam layer; forming a second color layer having a different color from the first color layer by coating and drying a composition for the second color layer on a surface of the second foam layer to have the same pattern as the second foam layer; forming a surface treatment layer by coating and drying a composition for the surface treatment layer on the surface of the second color layer to have the same pattern as the second color layer or coating and drying the composition for the surface treatment layer on the surface of the bonding layer without the foam layer and the surface of the color layer; and hot-pressing to perform foaming of the first foam layer and the second forming layer. Further, as illustrated in FIG. 5, in the manufacturing method of the artificial leather according to an exemplary embodiment of the present invention, the manufacturing method may further include alternately forming one or more foam layers and forming one or more color layers. For instance, the forming of the foam layer and the forming of the color layer may be alternately repeated several times or more. As a result, the formed foam layers may have different patterns and the color layers have different patterns and different colors, thereby eventually give various three-dimensional effects, colors, patterns, and the like to the artificial leather.

Figure 6:
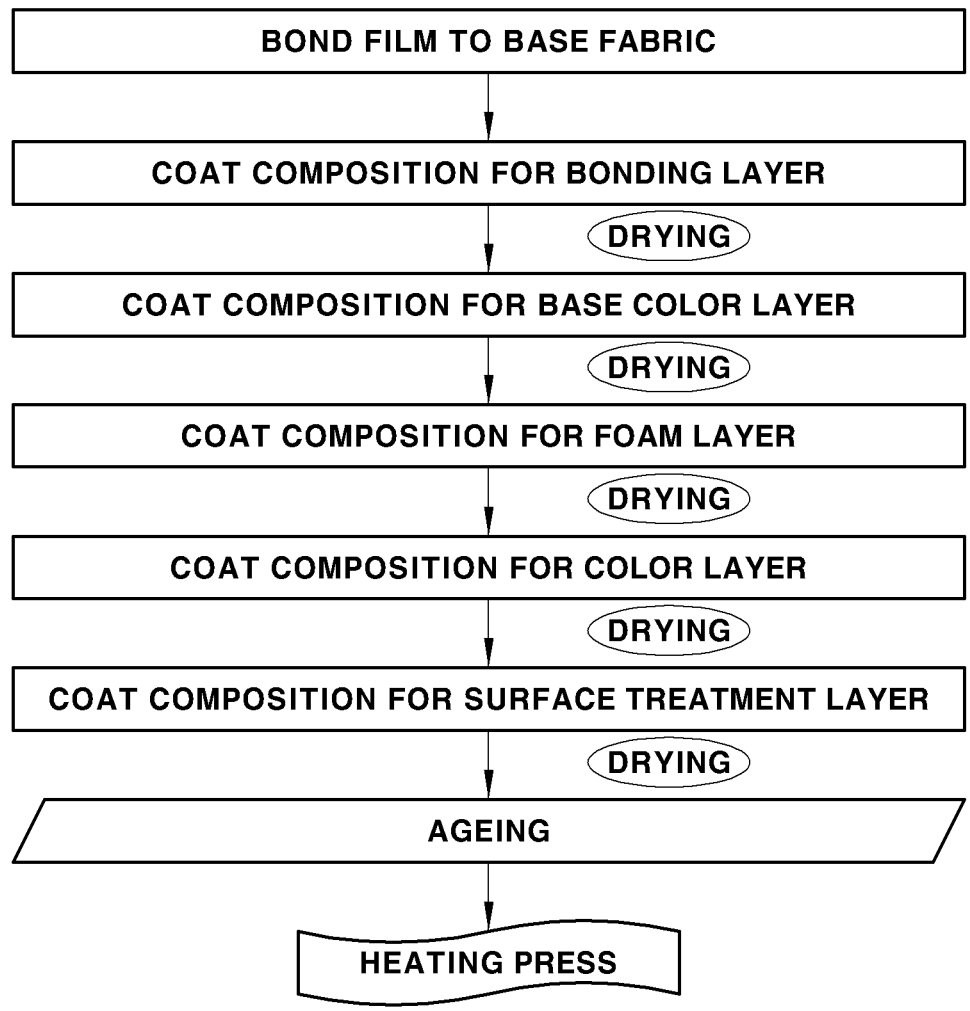
FIG. 6 illustrates an exemplary manufacturing process of an exemplary artificial leather according to an exemplary embodiment of the present invention.

FIG. 6 illustrates an exemplary manufacturing process of artificial leather according to an exemplary embodiment of the present invention. As illustrated in FIG. 6, the manufacturing method of artificial leather may include bonding a polyvinyl chloride film onto a surface of a base fabric; forming a bonding layer by coating and drying a composition for the bonding layer on a surface of the film; forming a base color layer by coating and drying a composition for the base color layer on a surface of the bonding layer in a patterned shape; forming a first foam layer by coating and drying a composition for the first foam layer on a surface of the base color layer in a patterned shape; forming a first color layer by coating and drying a composition for the first color layer on a surface of the first foam layer to have the same as the foam layer; forming a surface treatment layer by coating and drying a composition for the surface treatment layer on a surface of the first color layer to have the same pattern as the color layer, or coating and drying the composition for the surface treatment layer on the surface of the base color layer without the foam layer and a surface of the first color layer; and hot-pressing to performing foaming of the foam layers.

In addition, the manufacturing method may further include alternately forming one or more foam layers and forming one or more color layers. For instance, the forming of the foam layer and the forming of the color layer may be preferably alternately repeated at least two times. As a result, the formed foam layers may be different patterns and the color layers have different patterns and different colors, thereby eventually give various three-dimensional effects, colors, patterns, and the like to the artificial leather.

In an exemplary manufacturing method of the artificial leather according to the present invention, the polyvinyl chloride film may be bonded to the surface of the base fabric by calendering. During the calendering, a temperature of the roll may be preferably from about 140 to 180° C. and the supply speed of the base fabric and the polyvinyl chloride film may be preferably from about 20 to 35 m/min.

In an exemplary embodiment according to the present invention, the composition for the foam layer, the composition for the color layer (including the composition for the base color layer), and the composition for the surface treatment layer may be preferably coated in patterned shapes by screen printing.

In an exemplary embodiment according to the present invention, the hot pressing may be performed for about 5 to 60 seconds, at temperature of about 100 to 160° C. and at a pressure of about 150 to 250 kgf/cm$^2$ for smooth foaming of the foam layer. Further, in order to form leathery grains on the surface treatment layer and the like, embossing transfer may be performed together with the hot pressing. In order to facilitate stabilization respective layers and foaming by hot pressing, the manufacturing method may preferably further include drying and aging the respective layers formed on the base fabric with hot air for about 2 to 72 hours at a temperature of about 40 to 90° C. between the forming of the surface treatment layer and the hot pressing.

In an exemplary embodiment, after the coating of the composition for the bonding layer, the composition for the foam layer, the composition for the color layer or the composition for the surface treatment layer, the bonding layer, the forming of the foam layer, the forming of the color layer, or the forming of the surface treatment layer may be preferably dried at a drying temperature of about to 100° C. for a drying time of about 1 to 5 minutes.

The artificial leather manufactured by various exemplary manufacturing method of the present invention may be applied to various applications, such as shoes, bags, handbags, furniture, clothes, indoor and outdoor decorative materials, various household goods, accessories, automobile seat exterior materials, automotive door trim exterior materials.

EXAMPLE

Hereinafter, the present invention will be described in more detail through Examples. However, the following Examples are intended to clearly illustrate the technical features of the present invention and the scope of the present invention is not limited thereto.

1. Manufacture of Artificial Leather

Preparation Example 1

Manufacture of PVC Foam Artificial Leather 81 parts by weight of diisodecyl phthalate, 4 parts by weight of a processing aid, 0.6 part by weight of a foam stabilizer, 1 part by weight of a thermal stabilizer, 1 part by weight of a foaming agent, 10 parts by weight of an inorganic filler, 4 parts by weight of a white pigment, and 20 parts by weight of a flame retardant were added and mixed in 100 parts by weight of a polyvinyl chloride resin to prepare a composition for a lower film. Thereafter, a composition for the lower film was calendered to form a lower film having a thickness of about 0.3 mm, and the lower film was bonded to the H/Knit base fabric made of a PET material to prepare a first laminate configured by the base fabric and the lower film. At the time of calendering for preparing the first laminate, a roll temperature was at a temperature of 168±5° C. and a feeding speed was 25±2 m/min. 84 parts by weight of diisodecyl phthalate, 3 parts by weight of a processing aid, 5 parts by weight of a thermal stabilizer, 0.3 part by weight of an ultraviolet absorber, 5.2 parts by weight of a yellow pigment and 2.6 parts by weight of a flame retardant were added to 100 parts by weight of a polyvinyl chloride resin and mixed at a temperature of about 110° C. to prepare a composition for an upper film. Thereafter, a composition for the upper film was calendered to form an upper film having a thickness of about 0.2 mm and the formed upper film was bonded to the lower film of the first laminate to prepare a second laminate configured by the base fabric, the lower film, and the upper film. At the time of calendering for preparing the second laminate, a roll temperature was at a temperature of 172±5° C. and a feeding speed was 30±2 m/min. Thereafter, the upper film of the second laminate was coated with an acrylic resin surface treatment agent and dried at 80° C. to prepare a third laminate configured by the base fabric, the lower film, the upper film and the first surface treatment layer. Thereafter, the third laminate passed through a foaming chamber at a temperature of about 190 to 220° C. to foam the lower film, and the third laminate was pressed with an emboss roll engraved with leathery grains in a state that the film had fluidity to apply the leathery grains to the surface. Thereafter, the acrylic resin surface treatment agent was coated on the film of the first surface treatment layer of the third laminate and dried at a temperature of 130° C. to form a second surface treatment layer, and a polyurethane resin surface treatment agent was coated on the second surface treatment layer and dried at a temperature of 130° C. to prepare PVC foam artificial leather configured by the base fabric, the lower foam film, the upper film, the first surface treatment layer, the second surface treatment layer and the third surface treatment layer. The acrylic resin surface treatment agent included 1 to 5 wt % of a vinyl chloride/ vinyl acetate copolymer, 5 to 10 wt % of a methyl methacrylate polymer, 3 to 5 wt % of a silica powder, 1 to 5 wt % of cyclohexanone, 70 to 80 wt % of methyl ethyl ketone and 2 to 5 wt % of methyl isobutyl ketone.

The polyurethane resin surface treatment agent included 10 to 25 wt % of a polyurethane resin, 1 to 5 wt % of a silica powder, 1 to 7 wt % of ethylene glycol propyl ether, 30 to 60 wt % of methyl ethyl ketone, 1 to 7 wt % of butyl acetate, and 10 to 20 wt % of N,N-dimethylacetamide.

Preparation Example 2

Manufacture of Three-Dimensional Pattern Artificial Leather 84 parts by weight of diisodecyl phthalate, 3 parts by weight of a processing aid, 5 parts by weight of a thermal stabilizer, 0.6 part by weight of an ultraviolet absorber, 3.4 parts by weight of a yellow pigment and 13 parts by weight of a flame retardant were added to 100 parts by weight of a polyvinyl chloride resin and mixed at a temperature of about 110° C. to prepare a composition for a polyvinyl chloride film. Thereafter, a composition for the polyvinyl chloride film was calendered to form a polyvinyl chloride film having a thickness of about 0.35 mm, and the formed polyvinyl chloride film was bonded to an H/Knit base fabric made of a PET material to prepare a first laminate configured by the base fabric and the polyvinyl chloride film. At the time of calendering for preparing the first laminate, a roll temperature was at a temperature of 172±5° C. and a feeding speed was 25±2 m/min. Thereafter, a composition for a bonding layer composed of 35 wt % of polyurethane, 3 wt % of a curing agent, and 62 wt % of a diluted solvent was coated on the entire surface of the polyvinyl chloride film of the first laminate and dried at a temperature of 110° C. for 2 minutes and 30 seconds to form a bonding layer. Thereafter, a composition for a foamed layer composed of 30 wt % of polyurethane, 5 wt % of a foaming agent, 4% wt % of a curing agent and 61 wt % of a diluted solvent was coated on the surface of the bonding layer in a patterned form and dried at a temperature of 85° C. for 2 minutes and 30 seconds to form a foam layer. Thereafter, a composition for the color layer including 30 wt % of polyurethane, 10 wt % of a carbon block, 3 wt % of a curing agent and 57 wt % of a diluted solvent was coated on the surface of the foam layer to have the same pattern as the foam layer and dried at a temperature of 110° C. for 2 minutes and 30 seconds to form the color layer. Thereafter, a composition of the surface treatment layer including 13.5 wt % of a polycarbonateurethane resin, 13.5 wt % of a hydroxyl group-contained acrylic resin, 20.25 wt % of cyclohexanone, 24 wt % of methyl ethyl ketone, 4.5 wt % of dimethylformamide, 4.5 wt % of propylene glycol monomethyl ether acetate, 2.25 wt % of naphtha, 4.5 wt % of silica powder and 13 wt % of hexamethylene diisocyanate as a curing agent was coated on the surface of the color layer to have the same pattern as the color layer and dried at a temperature of 110° C. for 2 minutes and 30 seconds to form the surface treatment layer. Then, the base fabric formed with various layers in patterned shapes was placed in a hot air drying room and left at a temperature of 80° C. for 3 hours to age the layers formed on the base fabric. Then, each layer formed on the base fabric was hot-pressed at a temperature of 130° C. for 30 seconds by a hot presser with leathery grains to foam the foam layer and manufacture three-dimensional pattern artificial leather.

The curing agent used to form the bonding layer, the foam layer and the color layer was a mixture of aliphatic polyisocyanate and ethyl acetate at a weight ratio of 4:1, and the diluted solvent was a mixture of cyclohexanone, dimethylformamide and methyl ethyl ketone at a weight ratio of 6:1:2, and the foaming agent is a commercial product 416DU40 (Akzo Novel). The polycarbonate urethane resin used to form the surface treatment layer was a polymer formed by a polymerization reaction of hydroxy terminated polycarbonate diol (CAS registration No: 101325-00-2) formed by polymerization of carbonic acid, dimethyl ester, and 1,6-hexanediol and polyisocyanate selected from trimethylene diisocyanate, tetramethylene diisocyanate, hexamethylene diisocyanate, and the like. Further, the hydroxyl group-containing acrylic resin used for forming the surface treatment layer was an acrylic copolymer formed by a polymerization reaction of hydroxyethyl methacrylate and methacrylate.

2. Comparison of Physical Properties of Artificial Leather

The thicknesses, basis weights, tensile strength, tensile elongation, abrasion resistance and softness of the PVC foam artificial leather manufactured in Preparation Example 1 and the three-dimensional pattern artificial leather manufactured in Preparation Example 2 were measured based on a MS321-08 (applicable range: material performance and quality of artificial leather used in interior materials) standard test method as the internal test method of Hyundai Motor, and color diversity and three-dimensional effects were compared with each other. Then, the results were illustrated in the following Table 1 below.

TABLE 1

| Test item | PVC foam artificial leather of Preparation Example 1 | | Three-dimensional pattern artificial leather of Preparation Example 2 | |
|---|---|---|---|---|
| | Height | Length | Height | Length |
| Thickness (mm) | 1.0 | | 0.9 | |
| Basic weight (g/m$^2$) | 850 | | 616 | |
| Tensile strength (kg/30 mm) | 34 | 19.9 | 33.7 | 19.8 |
| Tensile elongation (%) | 47.0 | 192.9 | 79.5 | 140.9 |
| Abrasion resistance (grade) | 4 | | 4 | |
| Softness (mm) | 3.0 | | 3.4 | |
| Number of surface colors | 1 | | 2 | |
| Three-dimensional effect | Small | | Large | |

As illustrated in Table 1 above, when comparing the PVC foam artificial leather and the three-dimensional pattern artificial leather, the three-dimensional pattern artificial leather was reduced in weight by about 25 to 30% per unit thickness as compared with the PVC foam artificial leather and had slightly high softness. Also, the PVC foam artificial leather was a monochromatic product with only leathery embossed patterns, while the three-dimensional pattern artificial leather was a product which could implement two or more colors and had various designs and surfaces with unevenness.

As described above, the present invention has been described through the Examples, but is not always limited thereto, and various exemplary embodiments can be made within the range not departing from the scope and spirit of the present invention. Therefore, it should be interpreted that the scope of the present invention includes all embodiments belonging to claims accompanied in the present invention.

What is claimed is:

1. A method of manufacturing an artificial leather, comprising:
    bonding a polyvinyl chloride film onto a surface of a base fabric;
    forming a bonding layer by coating and drying a composition for the bonding layer on a surface of the film;
    forming a multilayer pattern layer on a surface of the bonding layer such that a first portion of the surface of the bonding layer is covered by the multilayer pattern layer and a second portion of the surface of the bonding layer is not covered by the multilayer pattern layer, the multilayer pattern layer having one or more foamable layers alternating with one or more color layers, wherein forming the multilayer pattern layer comprises alternately performing each of the following steps one or more times:
        forming a respective foamable layer by coating and drying a composition for the respective foamable layer in a patterned shape, wherein the respective foamable layer is applied to the bonding layer or to a previously applied color layer; and
        forming a respective color layer by coating and drying a composition for the respective color layer on a surface of the respective foamable layer to have the same patterned shape as the respective foamable layer;
    forming a surface treatment layer by coating and drying a composition for the surface treatment layer on a surface of the multilayer pattern layer such that the surface treatment layer covers only the multilayer pattern layer or such that the surface treatment layer covers the multilayer pattern layer and the second portion of the surface of the bonding layer, thereby forming a multilayer material; and
    hot-pressing the multilayer material to perform foaming of the one or more foamable layers.

2. The method of claim 1, wherein the forming the multilayer pattern layer comprises alternately performing each of the steps of forming a respective foamable layer and forming a respective color layer at least twice before the forming the surface treatment layer.

3. The method of claim 2, wherein the one or more foamable layers have different patterned shapes and the one or more color layers have different patterned shapes and different colors.

4. A method of manufacturing an artificial leather, comprising:
    bonding a polyvinyl chloride film onto a surface of a base fabric;
    forming a bonding layer by coating and drying a composition for the bonding layer on a surface of the film;
    forming a base color layer by coating and drying a composition for the base color layer on a surface of the bonding layer in a patterned shape such that a first portion of the surface of the bonding layer is covered by the base color layer and a second portion of the surface of the bonding layer is not covered by the base color layer;
    forming a multilayer pattern layer on a surface of the base color layer such that a first portion of the surface of the base color layer is covered by the multilayer pattern layer and a second portion of the surface of the base color layer is not covered by the multilayer pattern layer, the multilayer pattern layer having one or more foamable layers alternating with one or more color layers, wherein forming the multilayer pattern layer comprises alternately performing each of the following steps one or more times:
        forming a respective foamable layer by coating and drying a composition for the respective foamable layer in a patterned shape, wherein the respective foamable layer is applied to a surface of the base color layer or to a previously applied color layer; and
        forming a respective color layer by coating and drying a composition for the respective color layer on a surface of the respective foamable layer to have the same patterned shape as the respective foamable layer;

forming a surface treatment layer by coating and drying a composition for the surface treatment layer on a surface of the multilayer pattern layer such that the surface treatment layer covers only the multilayer pattern layer or such that the surface treatment layer covers the multilayer pattern layer, the second portion of the surface of the bonding layer and the second portion of the surface of the base color layer, thereby forming a multilayer material; and hot-pressing the multilayer material to perform foaming of the one or more foamable layers.

5. The method of claim 4, wherein the forming the multilayer pattern layer comprises alternately performing each of the steps of forming a respective foamable layer and forming a respective color layer at least twice before the forming the surface treatment layer.

6. The method of claim 5, wherein the one or more foamable layers have different patterned shapes and the one or more color layers have different patterned shapes and different colors.

\* \* \* \* \*